(12) United States Patent
Beck et al.

(10) Patent No.: US 8,961,028 B2
(45) Date of Patent: Feb. 24, 2015

(54) BEARING ASSEMBLY

(71) Applicants: Thilo Beck, Schweinfurt (DE); Rico Dittmar, Schweinfurt (DE)

(72) Inventors: Thilo Beck, Schweinfurt (DE); Rico Dittmar, Schweinfurt (DE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/928,826

(22) Filed: Jun. 27, 2013

(65) Prior Publication Data

US 2014/0023306 A1    Jan. 23, 2014

(30) Foreign Application Priority Data

Jun. 29, 2012 (DE) .......................... 10 2012 211 261

(51) Int. Cl.
| | |
|---|---|
| *F16C 19/38* | (2006.01) |
| *F16C 19/30* | (2006.01) |
| *F16C 35/06* | (2006.01) |
| *F16B 4/00* | (2006.01) |

(52) U.S. Cl.
CPC ................. *F16C 19/30* (2013.01); *F16C 35/06* (2013.01); *F16B 4/00* (2013.01); *F16C 19/386* (2013.01); *F16C 2226/12* (2013.01); *Y10S 384/905* (2013.01)
USPC .............................. 384/557; 384/585; 384/905

(58) Field of Classification Search
USPC ................................... 384/493, 557, 905, 585
See application file for complete search history.

(56) References Cited

U.S. PATENT DOCUMENTS

| | | | | |
|---|---|---|---|---|
| 3,512,856 | A | * | 5/1970 | Robinson ....................... 384/535 |
| 3,588,205 | A | * | 6/1971 | Daugherty .................... 384/473 |
| 4,741,091 | A | * | 5/1988 | Settles ........................... 384/585 |
| 6,599,021 | B2 | * | 7/2003 | Obara ............................ 384/493 |

FOREIGN PATENT DOCUMENTS

| | | |
|---|---|---|
| DE | 3420665 A1 | 12/1985 |
| DE | 60116574 T2 | 8/2006 |
| DE | 102005032888 A1 | 1/2007 |
| DE | 102005034717 A | 2/2007 |
| JP | 2002106585 A | 4/2002 |
| JP | 2009156399 A | 7/2009 |
| JP | 2010090984 A | 4/2010 |

\* cited by examiner

*Primary Examiner* — Thomas R. Hannon
(74) *Attorney, Agent, or Firm* — Bryan Peckjian; SKF USA Inc. Patent Dept.

(57) ABSTRACT

A bearing assembly includes a hub element or housing element which has an accommodating bore for at least one rolling-element bearing, the rolling-element bearing being disposed with its outer ring in a press-fit arrangement in the accommodating bore, and the outer ring having at least one first axial region along at least one raceway of the outer ring and at least one second axial region extending outside the raceway. To ensure a proper fit of the bearing ring in the hub or housing element over a wide range of operating temperatures, the receiving bore and the outer circumference of the outer ring are configured such that at the ambient temperature the radial clamping force between accommodating bore and outer ring in the first region is smaller than in the second region.

20 Claims, 3 Drawing Sheets

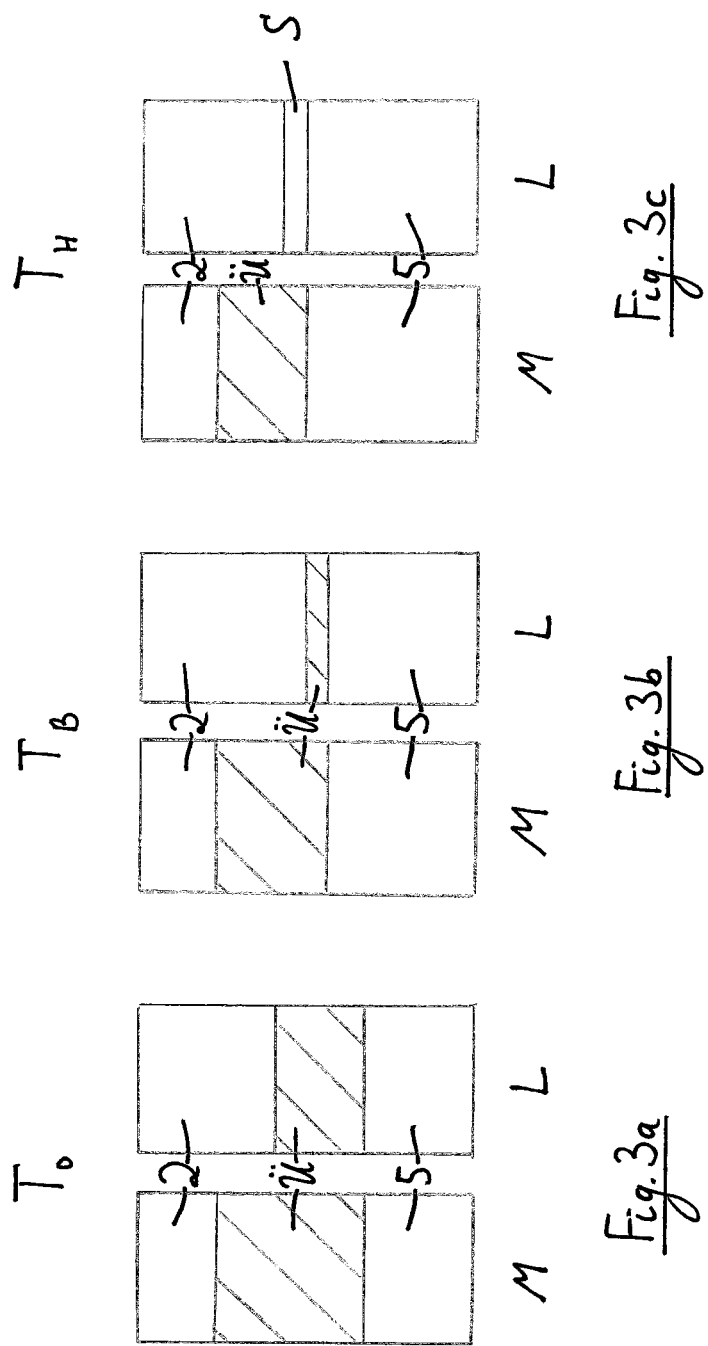

BEARING ASSEMBLY

CROSS-REFERENCE

This application claims priority to German patent application no. 10 2012 211 261.8 filed on Jun. 29, 2012, the contents of which are fully incorporated herein by reference.

TECHNICAL FIELD

The invention relates to a bearing assembly, comprising a hub element or housing element, which has an accommodating bore for at least one rolling-element bearing, wherein the rolling-element bearing is disposed with its outer ring press-fit in the accommodating bore. The outer ring has at least one first axial region, which extends along at least one raceway of the outer ring, and has at least one second axial region, which extends outside the raceway of the outer ring.

BACKGROUND

Conventional bearing assemblies of this type are well known in the prior art and are used, for example, as wheel hub bearings in motor vehicles. For strength reasons, the bearing rings of the rolling-element bearing are made mostly of steel, rolling-element bearing steel (100Cr6), for example, while a light metal such as aluminum, is used as the material for the hub element or housing element.

Aluminum wheel hubs are weight-saving and therefore advantageous for wheel bearing concepts. However, one disadvantage of aluminum is its substantially greater coefficient of thermal expansion compared to that of steel. This means that it is difficult to design the connection between steel parts and aluminum parts for all relevant temperature ranges. The different coefficients of thermal expansion have an especially negative impact in the compression force of the press-fit between the hub and bearing outer ring. At high temperatures the compression force can decrease so that the bearing outer ring can turn; as a result the hub or the bearing can be damaged.

At low temperatures, however, the aluminum hub strongly constricts the outer ring, so that high compression stresses occur. This can lead to cracking of the hub.

In compact bearings there is also the fact that with the use of a one-piece bearing outer ring, the influence of temperature on the bearing clearance is significant. The result is a disadvantageously large variation of the bearing clearance with respect to the temperature of the bearing assembly. This disadvantageously influences the service life of the bearing assembly.

Attempts have been made to prevent these problems by using cast iron as the hub material; however, the advantage of low weight is thereby lost.

Then the use of steel rings cast in an aluminum hub was envisaged, whereby the rigidity of the bearing can be increased, so that the influence of the press connection on the clearance is reduced. However, in such a solution it is disadvantageous that the costs increase, since the manufacture is relatively expensive, since additional parts must be made.

SUMMARY

In one aspect of the present teachings, a bearing assembly of the above-mentioned type is preferably formed or designed such that the disadvantages mentioned above are avoided. Accordingly, a proper fit of the bearing ring in the hub element or housing element should be ensured even with the use of different materials (for example, steel for the bearing rings and aluminum or aluminum alloy for the hub element or housing element) at all operating temperatures, without the need for expensive measures to be taken.

According to another aspect of the present teachings, the accommodating bore and the outer circumference of the outer ring may be configured such that at an ambient temperature of about 20° C. the radial clamping force between the accommodating bore and the outer ring in a first region (i.e. in the raceway region) is less than in a second region (i.e. outside the raceway region).

The tolerance in the first or raceway region between the accommodating bore and the outer ring is chosen to provide a less tight press-fit than the press-fit in the second region, that is, outside the raceway region.

The accommodating bore can have a larger diameter in the first region than in the second region. The outer ring can have a smaller diameter in the first region than in the second region. A combination of these embodiments is also possible, so that the accommodating bore in the first region has a greater diameter than in the second region, and the outer ring in the first region has a smaller diameter than in the second region.

The smaller diameter is preferably 99.50% to 99.98% of the larger diameter.

In the region of the second axial extension, the outer ring can also be provided with a profiling or other three-dimensional structure, whose outermost diameter exceeds the outer diameter of the outer ring in the first region. This profiling can be formed as a knurling or a fluting.

The rolling-element bearing is preferably formed with a double-row of rolling elements, and thus has two first regions, and the second region is disposed between the two first regions. Here it is further preferred that the outer ring is formed as one piece for both bearing rows.

The outer ring is preferably made of steel, such as 100Cr6 steel or AISI 52100 steel; the hub element or housing element is preferably made of light metal, such as aluminum or aluminum alloy.

According to the invention, the outer ring of a compact bearing or the hub is therefore manufactured such that the resulting radial overlap in the region outside the axial extension of the raceway is significantly higher than the raceway region, i.e. in the region of the roller set. For easy installation, both components, i.e. the hub and the bearing outer ring, can be manufactured with different diameters in at least one section.

This variation of the effective diameter can also be achieved by the aforementioned profiling in the form of a knurling at the center of the press-fit (i.e. between the two rolling-element rows).

The radial securing of the outer ring is therefore realized via the strong press-fit (optionally with knurling) in the center of the bearing between the two rolling-element rows. The press-fit (i.e. the overlap) in the first region, the region of the axial extension of the rolling elements, i.e. the roller set, is substantially less. The variation of the bearing clearance over the temperature range—influenced by the press-fit in the region of the roller sets—is thus substantially reduced.

Therefore the life or service life of the rolling-element bearing—influenced by the variation of the clearance—can be optimized and improved.

The wall thickness of the hub in the region of the opening of the bearing outer ring can be optimized to provide the desired clamping force; here large wall thicknesses in the central region between the two rolling-element rows, and small wall thicknesses in the region of the roller sets, are desired.

BRIEF DESCRIPTION OF THE DRAWINGS

An exemplary embodiment of the invention is illustrated in the drawings.

DETAILED DESCRIPTION OF THE INVENTION

Figure 1:
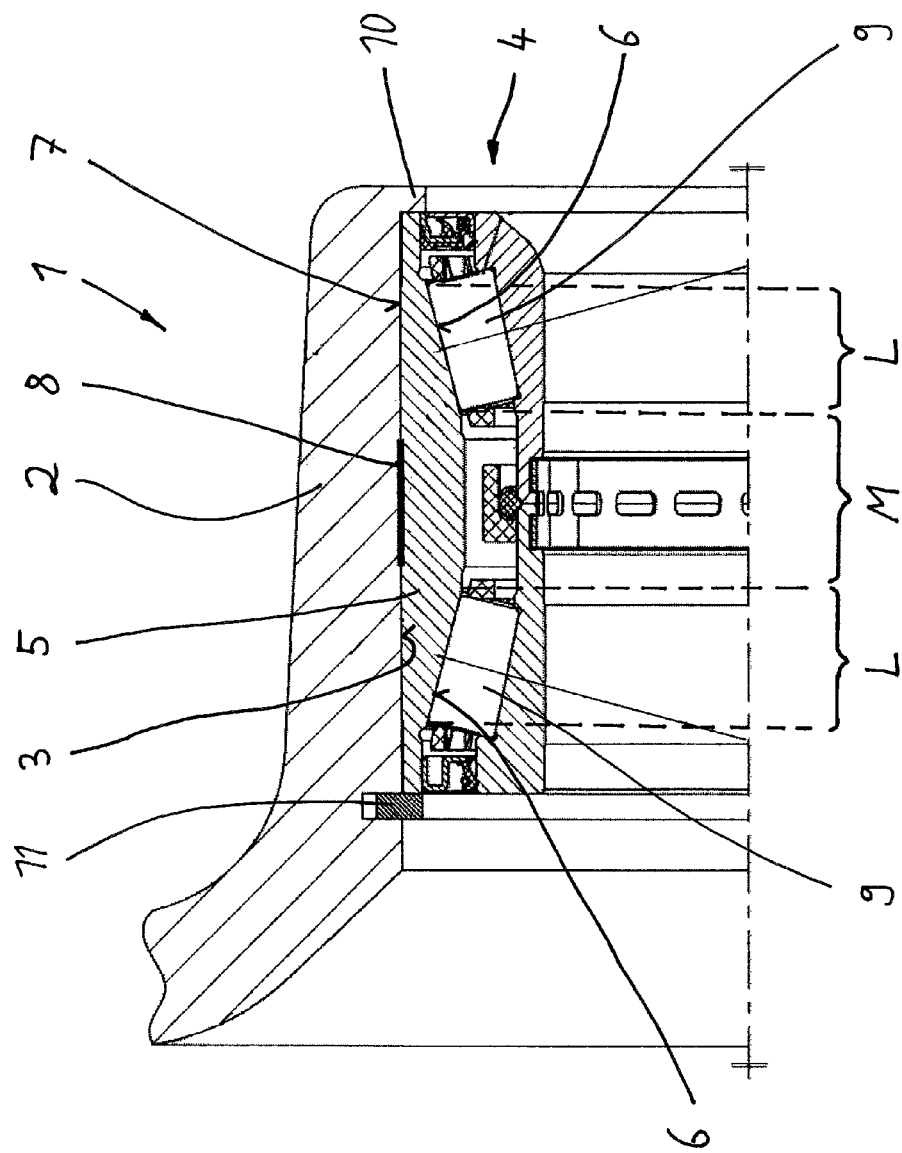
FIG. 1 is a radial cross-section through a bearing assembly, with which a wheel of a motor vehicle is supported.

In FIG. 1, a bearing assembly 1 is shown, with which a wheel of a motor vehicle is supported.

The bearing assembly comprises a hub (or boss) element or housing element 2, which has a cylindrical accommodation (or retaining) bore 3 for accommodating (or retaining) a rolling-element bearing 4.

The hub element or housing element 2 is made of aluminum; the bearing rings of the rolling-element bearing are made of steel. Very different coefficients of thermal expansion are therefore present.

In this embodiment, the rolling-element bearing 4 includes a one-piece outer ring 5, which has two raceways 6 for two rows of tapered rollers 9. Accordingly, a first region L of an axial extension can be defined, along which the raceway 6 axially extends. In addition, a second region M of an axial extension can be defined, which lies axially outside the raceways 6, between the raceways 6, for example.

As can be seen in FIG. 1, the outer ring 5 is axially fixed in the hub element 2 such that the hub element 2 has a shoulder 10 on one side (the right side as viewed in FIG. 1) for the axial abutment of the outer ring 5. The axial securing to the left is made by a snap ring 11.

At least at the ambient temperature (20° C.), there is a press-fit between the outer circumference 7 of the outer ring 5 and the accommodating bore 3.

It is important that the design of the accommodating bore 3 and the design of the outer circumference 7 of the outer ring 5 are chosen such that at the ambient temperature (i.e. at 20° C.), the radial clamping force between the accommodating bore 3 and the outer ring 5 in the first region, the region of the first axial extension L (raceway region) is smaller than in the second region, the region of the second axial extension M (central region between the two raceway regions).

This has the advantageous consequence that temperature-induced deformations due to the different thermal expansion coefficients do not cause the bearing clearance in the rolling-element bearing 4 to change significantly.

The outer ring 5 is held under ambient and elevated temperature conditions in the hub element 2 by the axial segment M, even if the press-fit between a conventional bearing ring and accommodating bore would possibly be lost at elevated temperature.

Figure 2:
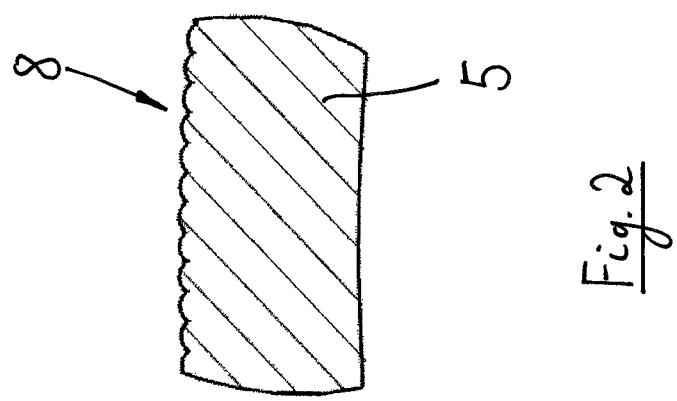
FIG. 2 is a sectional view of a segment of a bearing outer ring, as viewed in the axial direction, wherein the outer circumference of the bearing outer ring is provided with a knurling, FIG. 3a schematically shows the fitting ratios in the central region and in the raceway region of the rolling-element bearing at the ambient temperature (20° C.), FIG. 3b schematically shows the fitting ratios analogous to FIG. 3a at operating temperature, FIG. 3c schematically shows the fitting ratios analogous to FIG. 3a at an elevated temperature, and FIG. 4 schematically shows the diameter ratios in the central region and in the raceway region of the rolling-element bearing.

The connection between the outer ring 5 and the hub element 2 can be improved by providing a profiling 8 in the form of a knurling, as indicated in FIG. 2 on the outer ring 5. The profiling may improve the fixed retention of the outer ring 5 in the hub element 2.

In FIGS. 3a, 3b, and 3c, the overlap ratios due to the press-fit at three different temperatures (ambient temperature $T_O$, operating temperature $T_B$, and elevated temperature $T_H$) are depicted, shown respectively for the first or raceway region L and the second region, region M, outside the raceways.

As can be seen in FIG. 3a, at the ambient temperature $T_O$ (20° C.) a press-fit is always present between the outer ring 5 and the hub element 2, which press-fit is graphically represented by the overlap Ü. Thus a press-fit is present, both in region L and in region M, which is acceptable for the roller set.

Increasing the temperature to the operating temperature $T_B$ (e.g. to 50 to 60° C.) results—as illustrated in FIG. 3b—in that the press-fit loosens with a widened bore 3 in the hub element 2, with an albeit not-so-significantly widened outer ring 5. In both region M and region L there is a press-fit, even though the compression force is lower in region L than at ambient temperature $T_O$. An optimal seat or an optimal clearance is now provided for the roller set.

With a still further temperature increase to a high temperature $T_H$ of e.g. 100° C. (see FIG. 3c), the bore 3 in hub element 2 widens even further, but the outer ring 5 does not expand to the same extent. Consequently, the compression force of the press-fit between the hub elements 2 and the outer ring 5 decreases. As can be seen in FIG. 3c, a press-fit is still present in region M, while a clearance S is now present in region L. However, the outer ring 5 is still fixedly retained in region M by the still-present press-fit. A still-acceptable loose fit is now provided for the roller set of the rolling-element bearing.

Figure 4:
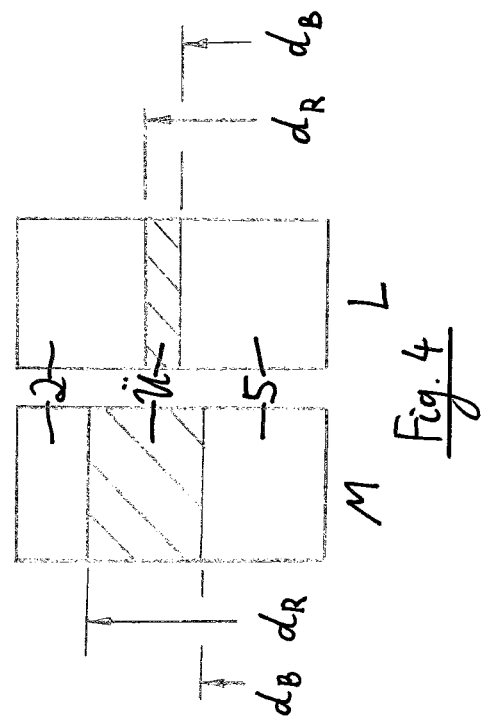

FIG. 4 shows the relation between the diameter ratios of the accommodating bore 3 on the one hand, and of the outer circumference 7 of the outer ring 5 on the other hand. It can be seen that in any case at room or ambient temperature (20° C.)—i.e. both in region M and in region L—the diameter $d_R$ of the bearing ring 5 is larger than the diameter $d_B$ of the bore 3.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved connections between a bearing outer ring and a bore.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity.

REFERENCE NUMBER LIST

1 Bearing assembly
2 Hub element or housing element
3 Accommodating bore
4 Rolling-element bearing
5 Outer ring
6 Raceway
7 Outer circumference of the outer ring
8 Profiling (knurling)
9 Tapered roller
10 Shoulder
11 Snap ring
L First axial extension (raceway region)
M Second axial extension (central region)
Ü Overlap (press-fit)
S Clearance
$d_R$ Bearing ring diameter
$d_B$ Bore diameter
$T_0$ Room/ambient temperature (20° C.)
$T_B$ Operating temperature
$T_H$ High temperature

The invention claimed is:

1. A bearing assembly comprising:
a housing element having an accommodating bore, and
an outer ring press-fit in the accommodating bore,
wherein the outer ring has an axial cross-section thereof that defines two first axial regions, which each define a separate outer raceway of the outer ring, a second axial region is located between and adjacent to the two first axial regions of the outer ring,
each of the two first axial regions having a separate row of rolling bearing elements,
the accommodating bore and the outer circumference of the outer ring are configured such that at ambient temperature ($T_0$) a radial clamping force between the accommodating bore and the outer ring in the two first axial regions is smaller than a radial clamping force between the accommodating bore and the outer ring in the second axial region, and
wherein the outer ring is configured such that a first radial thickness of each of the two first axial regions does not exceed a second radial thickness of the second axial region, the first radial thickness of the two first axial regions decreasing in a tapered continuous fashion in a direction axially away from the second axial region.

2. The bearing assembly according to claim 1, wherein, in the first axial region, a tolerance between the accommodating bore and the outer ring produces a press-fit having a lower compression force than a compression force in the second axial region.

3. The bearing assembly according to claim 1, wherein the accommodating bore has a larger diameter in the first axial region than in the second axial region and the outer ring has an outer circumferential surface in an axial cross-section thereof that is linear.

4. The bearing assembly according to claim 1, wherein the outer ring has a smaller diameter in the first axial region than in the second axial region.

5. The bearing assembly according to claim 1, wherein the outer ring is provided with a profiling in the second axial region, the outermost diameter of the profiling exceeding the outer diameter of the outer ring in the first axial region.

6. The bearing assembly according to claim 5, wherein the profiling comprises knurling.

7. The bearing assembly according to claim 1, wherein the rolling-element bearing is formed as a double-row and has two first axial regions, wherein the second axial region is disposed between the two first axial regions, and wherein the outer ring is formed as a single element for both bearing rows.

8. A bearing comprising:
a hub element having an accommodating bore having a bore wall; and
an outer ring, the outer ring having an outer wall, the outer wall further comprising first axial regions being axially aligned with two raceways and a second axial region of the outer wall being not axially aligned with the two raceways, the second axial region is located between the two first axial regions of the outer ring;
wherein the bore wall and the outer wall are configured such that a compression force between the bore wall and the outer wall in the first axial region is less than a compression force between the bore wall and the outer wall in the second axial region,
wherein the outer ring is configured such that a second radial thickness of the second axial region is not exceeded by a first radial thickness of each of the two first axial regions, the first radial thickness of the two first axial regions decreasing in a tapered continuous fashion in a direction axially away from the second axial region.

9. The bearing according to claim 8, wherein a portion of the accommodating bore aligned with the first axial region has a larger diameter than a portion of the accommodating bore aligned with the second axial region.

10. The bearing according to claim 8, wherein the first axial region of the outer wall has a smaller diameter than the second axial region of the outer wall.

11. The bearing according to claim 8, wherein the at least one raceway comprises first and second raceways and wherein the first axial region comprises a first section aligned with the first raceway and a second section aligned with the second raceway.

12. A bearing assembly comprising:
a hub element or housing element having an accommodating bore, and
at least one rolling-element bearing having an outer ring press-fit in the accommodating bore,
wherein the outer ring has at least one first axial region, which extends along at least one raceway of the outer ring, and has at least one second axial region, which extends outside the at least one raceway of the outer ring, and
the accommodating bore and the outer circumference of the outer ring are configured such that at ambient temperature ($T_0$) a radial clamping force between the accommodating bore and the outer ring in the first axial region is smaller than a radial clamping force between the accommodating bore and the outer ring in the second axial region, wherein the accommodating bore has a larger diameter in the first axial region than in the second axial region and wherein the outer ring has a smaller diameter in the first axial region than in the second axial region.

13. The bearing assembly according to claim 12, wherein the smaller diameter is 99.50% to 99.98% of the larger diameter.

14. A bearing assembly comprising:
a hub element or housing element having an accommodating bore, and at least one rolling-element bearing having an outer ring press-fit in the accommodating bore,
wherein the outer ring has at least one first axial region, which extends along at least one raceway of the outer ring, and has at least one second axial region, which extends outside the at least one raceway of the outer ring, and
the accommodating bore and the outer circumference of the outer ring are configured such that at ambient temperature ($T_0$) a radial clamping force between the accommodating bore and the outer ring in the first axial region is smaller than a radial clamping force between the accommodating bore and the outer ring in the second axial region, wherein the outer ring is comprised of steel and the hub element or housing element is comprised of aluminum.

15. A bearing assembly comprising:
a hub element or housing element having an accommodating bore, and
at least one rolling-element bearing having an outer ring press-fit in the accommodating bore,
wherein the outer ring has at least one first axial region, which extends along at least one raceway of the outer ring, and has at least one second axial region, which extends outside the at least one raceway of the outer ring, and
the accommodating bore and the outer circumference of the outer ring are configured such that at ambient temperature ($T_0$) a radial clamping force between the accommodating bore and the outer ring in the first axial region is smaller than a radial clamping force between the accommodating bore and the outer ring in the second axial region,
wherein the accommodating bore has a larger diameter in the first axial region than in the second axial region or the outer ring has a smaller diameter in the first axial region that in the second axial region,
wherein the outer profile is provided with a profiling in the second axial region, and
wherein the outer ring is comprised of steel and the hub element or housing element is comprised of aluminum.

16. A bearing assembly comprising:
a hub element or housing element having an accommodating bore, and
at least one rolling-element bearing having an outer ring press-fit in the accommodating bore,
wherein the outer ring has at least one first axial region, which extends along at least one raceway of the outer ring, and has at least one second axial region, which extends outside the at least one raceway of the outer ring, and
the accommodating bore and the outer circumference of the outer ring are configured such that at ambient temperature ($T_0$) a radial clamping force between the accommodating bore and the outer ring in the first axial region is smaller than a radial clamping force between the accommodating bore and the outer ring in the second axial region,
wherein the hub element or housing element is made of a first material having a first coefficient of thermal expansion, wherein the outer ring is made of a second material having a second coefficient of thermal expansion, and wherein the first coefficient of thermal expansion is less than the second coefficient of thermal expansion.

17. A bearing comprising:
a hub element having an accommodating bore having a bore wall; and
at least one rolling-element bearing mounted in the accommodating bore and having an outer ring, the outer ring having at least one raceway and an outer wall, a first axial region of the outer wall being axially aligned with the at least one raceway and a second axial region of the outer wall being not axially aligned with the at least one raceway;
wherein the bore wall and the outer wall are configured such that a compression force between the bore wall and the outer wall in the first axial region is less than a compression force between the bore wall and the outer wall in the second axial region, wherein the hub element is made of a first material having a first coefficient of thermal expansion, wherein the outer ring is made of a second material having a second coefficient of thermal expansion, and wherein the first coefficient of thermal expansion is less than the second coefficient of thermal expansion.

18. A bearing comprising:
a hub element having an accommodating bore having a bore wall; and
at least one rolling-element bearing mounted in the accommodating bore and having an outer ring, the outer ring having at least one raceway and an outer wall, a first axial region of the outer wall being axially aligned with the at least one raceway and a second axial region of the outer wall being not axially aligned with the at least one raceway;
wherein the bore wall and the outer wall are configured such that a compression force between the bore wall and the outer wall in the first axial region is less than a compression force between the bore wall and the outer wall in the second axial region, a portion of the accommodating bore is aligned with the first axial region has a larger diameter than a portion of the accommodating bore aligned with the second axial region, wherein the first axial region of the outer wall has a smaller diameter than the second axial region of the outer wall.

19. The bearing according to claim 18, wherein the at least one raceway comprises first and second raceways and wherein the first axial region comprises a first section aligned with the first raceway and a second section aligned with the second raceway.

20. The bearing according to claim 19, wherein the hub element is made of a first material having a first coefficient of thermal expansion, wherein the outer ring is made of a second material having a second coefficient of thermal expansion, and wherein the first coefficient of thermal expansion is less than the second coefficient of thermal expansion.

* * * * *